July 11, 1944.　　　G. M. MAGRUM ET AL　　　2,353,577
OIL TEMPERATURE REGULATING STRUCTURE
Filed July 6, 1942　　　3 Sheets-Sheet 2

Inventors
Gervase M. Magrum
Harry L. Chisholm, Jr
Andrew D. Hodge
by Charles W. Hills Attys.

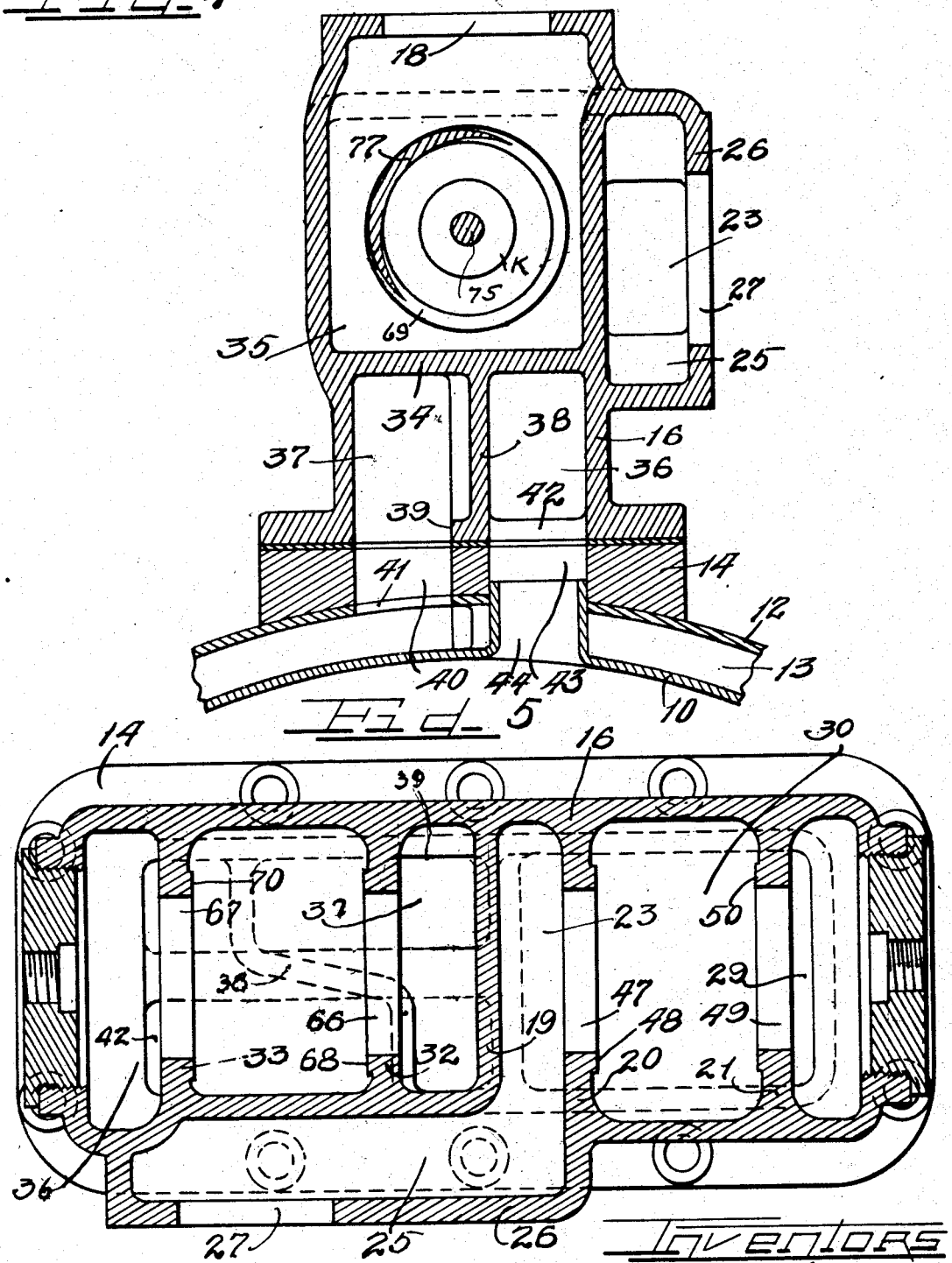

Patented July 11, 1944

2,353,577

UNITED STATES PATENT OFFICE 2,353,577

OIL TEMPERATURE REGULATING STRUCTURE

Gervase M. Magrum, Harry L. Chisholm, Jr., and Andrew D. Hodge, Buffalo, N. Y., assignors to Houdaille-Hershey Corporation, Detroit, Mich., a corporation of Michigan Application July 6, 1942, Serial No. 449,950

12 Claims. (Cl. 236—34)

This invention relates to temperature regulation of the lubricating oil for hydrocarbon engines, particularly aircraft engines, in order to keep the oil in the most desirable condition for efficient lubrication.

The usual method for temperature regulation of oil is to provide an oil cooler comprising a radiator through which the oil from the engine may circulate to be cooled, and a warming jacket surrounding the radiator for warming the oil in the radiator at low temperatures, together with valve means for normally shutting off the flow through the warming jacket but for opening up for such flow in case of impediment to the oil flow through the radiator as when the flow through the radiator becomes sluggish or congealed. Such prior art valve structure is usually in the form of a valve held closed by spring pressure until it is subjected to sufficient pressure to be opened in case of stoppage of flow through the radiator.

An important object of our invention is to provide improved valving means which is thermostatically controlled and which will more effectively and with greater precision control and apportion the oil flow through the radiator and the warming jacket to more efficiently control the oil temperature for proper flow and lubricating condition.

Another important object is to adapt the valving means, normally thermostatically controlled, to be responsive to excessive pressure, as in the case of congealing of the oil in the radiator path or in the warming jacket path, to quickly open to relieve the pressure.

A further object is to provide an arrangement in which a thermostatic valving assembly is interposed in the inlet to the radiator and warming jacket, and another thermostatically controlled valving assembly is interposed in the outlet from the radiator and the warming jacket so that the temperature of both the inflowing oil and the outflowing oil is effective on the thermostate means for control thereby of the valving assemblies.

Still another object is to provide an arrangement in which the inlet valving assembly primarily shuts off flow of the oil from the engine to the radiator and warming jacket and by-passes the oil from the engine directly to a reservoir from which the oil is pumped for delivery to the engine, so that the oil, after starting in the eng'ne, will first be warmed up until the thermostat means for the inlet valving assembly will respond to set this assembly for permitting flow to the radiator and warming jacket and eventually cutting off the flow from the engine directly to the reservoir.

The invention also embodies other important features, all the various features being embodied in the structure shown on the drawings, in which:

Figure 4 is a section on plane IV—IV on Figure 2; and

Figure 5 is a section on plane V—V on Figure 2.

Figure 1:
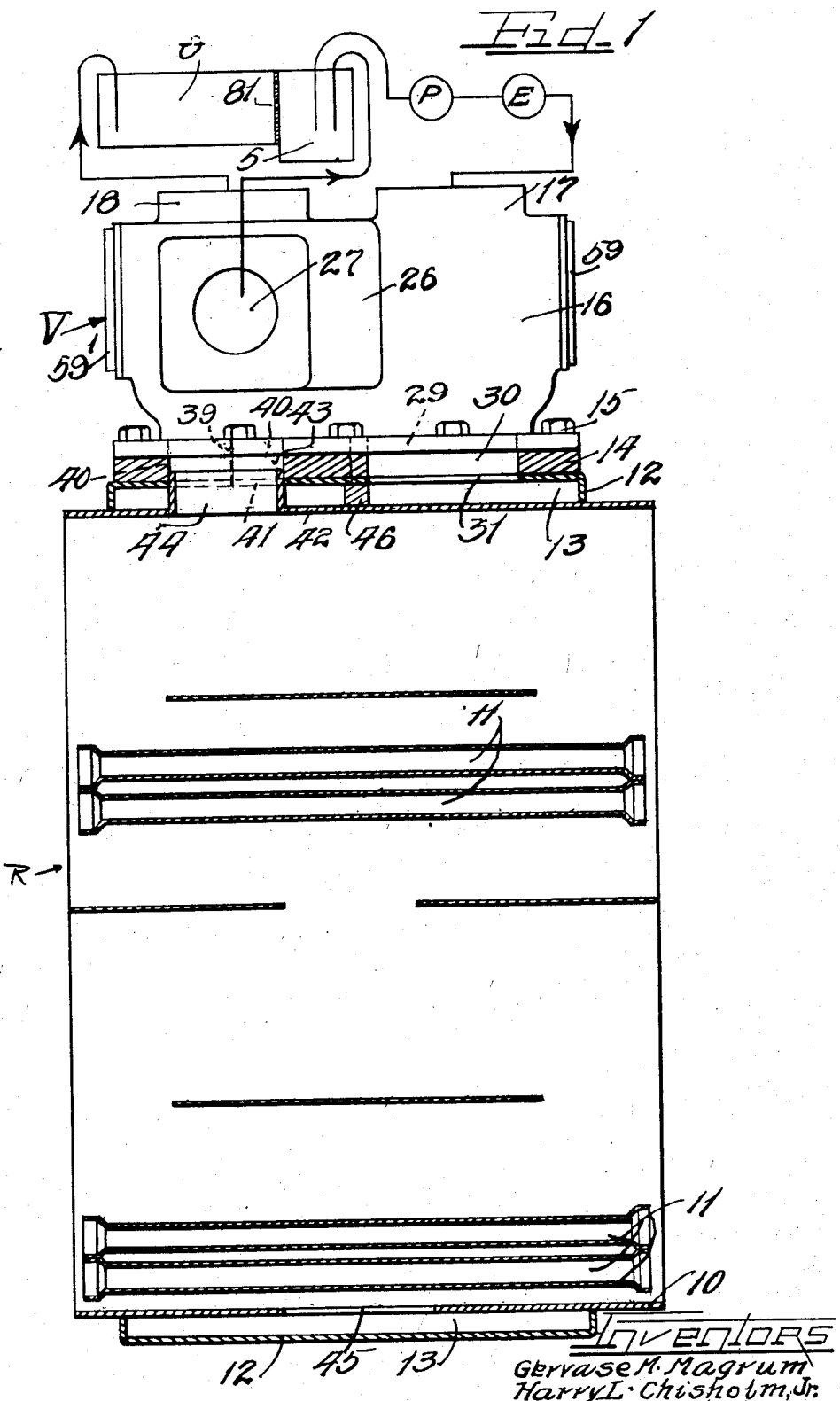
Figure 1 is a side elevation, partly in section, of an oil cooler with the improved valve structure thereon.

Referring particularly to Figure 1, R indicates the radiator structure and V the valve structure. The radiator structure shown is of a conventional type comprising the cylindrical shell through which extend the tubes 11 soldered or otherwise secured together at their ends and exposed for the flow therethrough of air during running of the vehicle. Surrounding the shell 10 is the warming jacket 12 providing the annular warming space 13 around the shell. Mounted on top of the warming jacket is a base or plate 14 on which the valve structure V seats and is secured as by screws 15.

The valve structure V comprises the housing 16 having the inlet 17 for the oil from the engine, and the outlet 18 for the return flow from the radiator and warming jacket to the reservoir from which the oil to the engine is pumped. Between the inlet and the outlet, the valve housing has the vertical wall 19, and within the housing below the inlet 17 are the transverse walls 20 and 21 between the sides of the housing and connected at their lower ends by the horizontal wall 22 extending between the sides of the housing, the wall 22 continuing to the vertical wall 19. The wall 20 is inwardly spaced from the wall 19 to leave a space 23. The walls, 20, 21 and 22 together with the side walls of the housing 16 define a valve chamber 24.

The space 23 communicates with the space 25 between the front side wall of the housing 16 and the offset wall 26 thereon, this offset wall having the outlet 27 which, as will be explained more in detail later, is connected with the reservoir from which the engine supply pump draws the oil.

Surrounding the walls which define the valve chamber 24 is the inlet space 26, the outlet passageway 29 from which registers with the passageway 30 through the base 14 on the warming jacket, the jacket having the inlet 31 communicating with the passageway 30.

Within the housing 16 below the outlet 19 are the transverse walls 32 and 33 and the horizontal wall 34 which, with the sides of the housing 16, define a valve chamber 35. Between the wall 32 and the wall 19 is the space 37, and between the wall 33 and the adjacent end of the housing 16 is the space 36, these spaces being separated from each other by the partition wall 38. In the base of the housing 16 is the inlet passageway 39 for the space 37 which registers with the passageway 40 in the base plate 14 on the radiator jacket 12, which passageway is in registration with the outlet 41 of the warming jacket. The inlet passageway 42 in the base of the housing 16 for the space 36 registers with the passageway 43 in the base plate 14, the passageway 43 registering with the outlet 44 of the radiator R. In its lower side the radiator has the inlet passageway 45 communicating with the warming jacket space 30. The wall 46 extends across the warming jacket space 13 between the jacket inlet 31 and its outlet 44 so that the fluid entering the inlet 31 must travel entirely circumferentially through the forming space 13 before reaching the jacket outlet 41.

Figure 2:
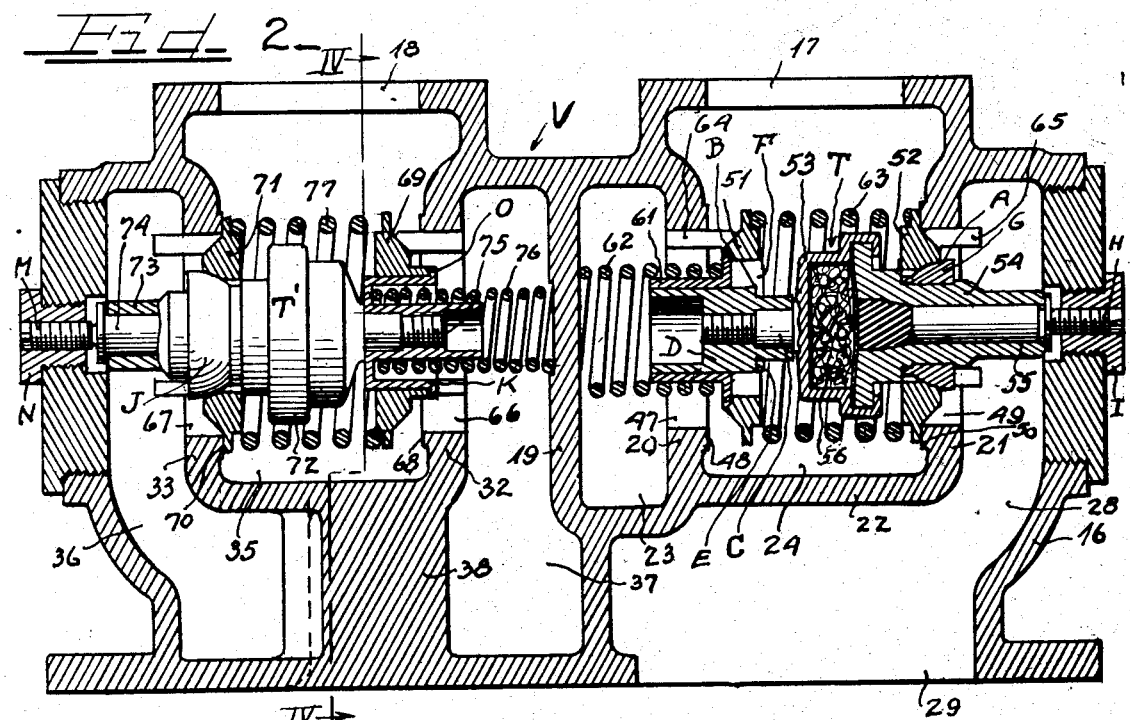
Figure 2 is a vertical longitudinal section of the valve structure showing the thermostat valve assemblies in position for by-pass flow and shutting off of the radiator flow.

Referring to Figures 2 and 5, in the inlet passageway of the valve structure V, the wall 20 has the passageway 47 therethrough which at its inner end is surrounded by a valve seat 48, and the wall 21 has the passageway 49 therethrough surrounded at its inner end by a valve seat 50. Within the valve chamber 24 there is a valving assembly comprising the annular valve 51 and the annular valve 52 for cooperating respectively with the valve seats 48 and 50. Between these valves is a thermostat T which may be of the type known in the trade as the "Vernet" type. This thermostat comprises the body or container 53 from which extends a neck 54 for a plunger 55 to be acted upon by material 56 within the container which, when expanded by rising temperature, will shift the plunger 55 outwardly. The thermostat neck 54 extends axially through the valve 52, and has rigidly secured thereto a collar G, the outside of which has a spherical surface A. The valve 52 has an internal mating surface, and is held against the surface A by a spring 63, which is interposed between the valves 51 and 52.

Figure 3:
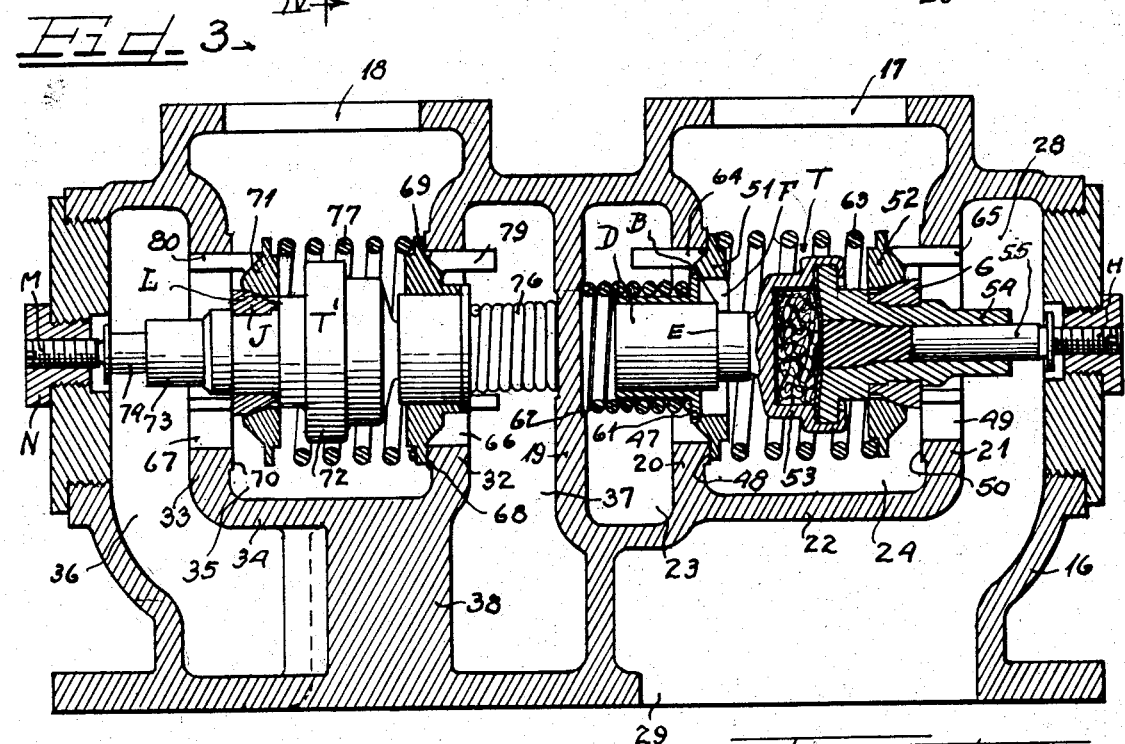
Figure 3 is a similar section but showing the thermostat valve assemblies in position for normal operation of the cooler.

Formed on the inner end of the thermostat body 53 is a stud C to which is rigidly secured a sleeve D which has, at its inner end, a shoulder E. Slidably mounted on sleeve D is the annular relief valve 61, the head of which has the spherical surface B and is held against a mating surface within the valve 51 by a spring 62, the inner end of which seats against the transverse wall 19. Inwardly projecting from the annular valve 51 are the fingers F which, reacting against the shoulder E on the sleeve D, form a stop for the valve 51 against the spring 63. This unitary assembly comprising the thermostat, the three valves 51, 52 and 61, the spring, 63, the collar G and the sleeve D is shiftable axially, this movement being guided by the guide wings 64 and 65 on the valves 51 and 52, respectively engaging with the walls 20 and 21. The thermostat is adjusted so that at temperatures below, say, 100° F., the thermostat will be in its contracted position and its body together with the valves will be shifted to the right (Figure 2) by the spring 62 for unseating of the valve 51 and seating of the valve 52, the thermostat body receiving the plunger 55 whose head at this time is held by the spring 62 against the adjusting screw H in the plug I. As the thermostat is subjected to higher temperature, the material therein will expand, and as the spring 63 is stronger than the spring 62, the thermostat body with the valves thereon will be shifted away from the plunger 55 and toward the left for the opening of the valve 52 and the closure of the valve 51, and as the temperature rises, the valve 52 will eventually be fully opened and the valve 51 fully closed (Figure 3). The thermostat may continue to expand after the valve 51 has been seated and unless such overtravel of the thermostat were allowed for the thermostat body would burst. To allow for such overtravel, the sleeve D attached to the thermostat slides axially to the left within the relief valve 61, the shoulder E of sleeve D moving away from the stop fingers of the valve 51; and the collar G, also attached to the thermostat, pulls the valve 52 further to the left to a position beyond its normal full open position. The spherical surfaces A and B of the collar G and sleeve D permit the valves 52 and 51 to align themselves properly on their respective seats 50 and 48, should there be any misalignment of the component parts.

In the valve chamber 35 in the outlet side of the frame 16, a thermostat and valve assembly is provided for controlling the passageway 66 in the wall 32 and the passageway 67 in the wall 33. Surrounding the inner end of the passageway 66 is the seat 68 for the annular valve 69, and surrounding the inner end of the passageway 67 is the seat 70 for the annular valve 71. The thermostat T¹ comprises the body 72 having rigidly secured to its neck 73 the collar J, the outside surface of which has the spherical portion L and receiving the plunger 74 the head of which abuts the adjusting screw M in the plug N. At its inner end, the thermostat body has formed on it the stud 75, rigidly secured to which is the sleeve K, which has at its inner end the stop shoulder O and on which is slidably mounted the valve 69. Interposed between the valves 69 and 71 is the spring 77, which urges the valves against the shoulder O and the spherical surface L, respectively. The spherical surface L permits proper seating of valves 71 and 69, should there be any misalignment of component parts.

The axial movement of the thermostat and valve assembly is guided by the guide wings 79 and 80 on the valves 69 and 71, respectively, engaging the walls 32 and 33. The thermostat T' is adjusted so that when the temperature is below, say 150° F., the thermostat will be contracted and the spring 76 will hold the thermostat and valve assembly for closure of the valve 71 and the opening of the valve 69. When subjected to higher temperature, the thermostat will expand, and the expanding material, acting against the plunger 74, will cause the thermostat body with the valves thereon to be shifted toward the right for opening movement of the valve 71 and closing movement of the valve 69, and as the temperature continues to rise, the valve 71 will eventually be fully open, and the valve 69 fully closed. Any overtravel of the thermostat body, after seating of the valve 69, will result merely in further opening of the valve 71 against the resistance of the spring 77 and the spring 76.

On Figure 1 is diagrammatically shown a supply reservoir U for lubricating fluid from which the pump P draws the oil for delivery to the engine E, the oil flowing from the engine through the inlet 17 of the valve structure V. The pump preferably draws the oil from a sump portion S separated from the main portion of the reservoir U by a suitable baffle 81, the auxiliary outlet 27 for the space 23 in the valve structure returning oil to this sump. The outlet 18 for the valve structure may be connected for discharge of the oil into the main body of the reservoir O.

Describing now the operation, before the engine is started, the temperature in the valve structure V is such that the thermostat T and T' are contracted, as shown on Figure 2, the valves 51 and 52 being respectively open and closed, and the valves 69 and 71 being respectively open and closed. For example, the thermostat T is adjusted to remain contracted under, say, 100° F. and the thermostat T' is adjusted to remain contracted under, say, 150° F. As the engine now starts, the pump P driven thereby will draw oil from the sump U and force it through the engine bearings, the oil then flowing from the engine into the inlet 17 of the valve structure V and past the open valve 51 through the passageway 47 into the space 23 and from there through the auxiliary outlet 27 back to the sump. This permits a rapid warming up of a relatively small volume of the oil which, upon engagement with the thermostat element T, raises the temperature thereof above 100° F. for operation thereof to open the valve 52 and move the valve 51 toward its closing position so that oil may then flow into the inlet space 28 and through passageways 29 and 30 to the inlet 31 of the warming jacket, and through the warming jacket out of the jacket outlet 41 through passageways 40 and 39 into the space 37 and past the open valve 69 through the outlet 18 back to the main body of the reservoir U. After the temperature around the thermostat T reaches, say, 140° F., the thermostat will have expanded to fully open the valve 52 and fully close the valve 51 (Fig. 3), and all of the engine oil will now flow through the warming jacket around the radiator. This oil from the jacket will warm up the thermostat T' for opening movement thereby of the valve 71 and closing movement of the valve 69. As soon as the valve 71 opens, oil will flow from the warming jacket through the radiator inlet 45 and through the radiator around the various tubes 11 and through the radiator outlet 44 into the space 36, and past the open valve 71 and through the outlet 18 to the reservoir U. When the temperature around the thermostat T' reaches, say, 180° F., the thermostat will have fully opened the valve 71 and fully closed the valve 69 (Fig. 3) so that all of the oil from the engine will flow through the radiator to be cooled by the air flowing through the radiator tubes 11. Should the temperature around the thermostat T' fall below 180° F., it will effect corresponding partial opening of the valve 69 for flow of warm oil through the jacket to compensate for the drop in temperature of the oil flow through the radiator, and thus the thermostat T' is continually active to apportion the flow through the radiator and the warming jacket to keep the oil at the proper service temperature.

In operation of airplanes, quick temperature changes may be encountered. Upon a sudden pronounced drop in temperature, the cold air flowing through the radiator may suddenly thicken and congeal the oil therein to stop flow through the radiator even though the outlet valve 71 may be wide open. In order to prevent building up of dangerously high pressure in the radiator under these conditions, the valve 69 will function as a relief or blow-off valve. As has been explained, this valve is slidable on the thermostat sleeve K and when flow through the radiator is suddenly checked, the oil from the engine will tend to continue its flow through the warming jacket, and the pressure of this flow against the valve 69 will unseat it against the resistance of the spring 77 so that the oil may flow through the warming jacket back to the reservoir until the heat from the warming jacket sufficiently thins the oil in the radiator for resumption of flow through the radiator. The spring 77 is dimensioned so that opening of the valve 69 will be permitted when a certain predetermined pressure is reached, say, thirty pounds per square inch.

Should the oil both in the radiator and the jacket suddenly become congealed, and flow therethrough checked, the relief valve 61 will function. The spring 62 tends to keep this valve closed, but the pressure built up in the inlet space 17, when flow through the radiator and the jacket is stopped, will force this valve off its seat and away from the valve 51 to open up the passageway to the space 23 for by-passage of oil through the auxiliary outlet 27 direct to the reservoir.

As has been explained, the valve 61 is slidable on the sleeve D, and the spring 62 is so dimensioned that when the valve 51 is in the closed position (Figure 3), it will resist opening of the valve 61 until a predetermined oil pressure is reached, say, 75 lbs. per square inch.

After opening of the valve 61 for by-passage of oil to the sump S, the oil in the space 28 is rapidly heated, and this heat, together with the built-up pressure in the space 28, will quickly cause resumption of flow through the warming jacket and warming of the oil in the radiator to flowing condition, and then, as the pressure is relieved, the valve 61 will close for re-establishment of normal operating conditions. Upon stopping of the engine, the valving assemblies in the valve chambers 24 and 35 will be brought back to their normal positions by the springs 62 and 76 as the respective thermostats cool off.

We have disclosed a practical and efficient embodiment of our invention but do not desire to be limited to the exact structure, arrangement and operation shown and described, as changes and modifications may be made without departing from the scope of the invention.

We claim as our invention:

1. A controlling valve structure for the radiator flow and warming chamber flow of an oil cooler, comprising a housing and a passageway therethrough for flow of oil to the radiator and warming chamber, said housing having an outlet passageway for oil from the radiator and another outlet passageway for the oil from the warming chamber, a valve in said housing for the radiator outlet passageway and a valve for the warming chamber outlet passageway, and thermostat means subjected to the temperature of the oil flow through said outlet passageways for setting of said valves for apportionment of the flow through the radiator and the flow through the warming chamber, and means whereby said warming chamber outlet passageway valve, after closure thereof by said thermostat means, may move independently of said thermostat means to be responsive to the increased warming chamber pressure upon stoppage of flow through the radiator to open said warming chamber outlet passageway.

2. A valve structure for an internal combustion engine oil cooler connected to discharge the cooled oil into a reservoir from which the engine is supplied with lubricating oil by a pump, comprising a valve chamber for receiving the oil from the engine, a supply passageway from said valve chamber to the cooler, a by-passageway from said valve chamber directly to the reservoir, a thermostat comprising a generally cylindrical body containing temperature-responsive medium and a plunger actuated thereby, an annular valve for said supply passageway concentric with and seated on said thermostat body, an annular valve for said by-passageway concentric with and mounted on said thermostat body and having a passageway therethrough, a spring interposed between said valves tending to hold them in normal position on said thermostat body, a stationary abutment for the outer end of the plunger of said thermostat, said supply passageway valve and said by-passageway valve being respectively closed and opened by said thermostat when said thermostat is contracted and expansion of said thermostat under temperature increase effecting respectively opening and closing of said supply passageway and by-passageway, a relief valve slidable on said thermostat body and a spring normally holding said relief valve for closure of the passageway through said by-passageway valve, said spring yielding to predetermined oil pressure in said valve chamber for opening of said relief valve for flow of oil from the engine directly to said reservoir in the event that flow through said supply passageway is stopped while said supply passageway valve is open and said by-passageway valve is closed.

3. A valve structure for an internal combustion engine cooler connected to discharge the cooled oil into a reservoir from which the engine is supplied with lubricating oil by a pump, comprising a valve chamber for receiving the oil from the engine, a supply passageway from said valve chamber to the cooler, a by-passageway from said valve chamber directly to the reservoir, a valve for said supply passageway and a valve for said by-passageway, a thermostat comprising a body of generally cylindrical shape containing temperature-responsive medium and a plunger to be actuated thereby, said thermostat body extending through said valves and having shoulders, a spring between said valves tending to hold them against said shoulders, an abutment for the outer end of the thermostat plunger, said thermostat when contracted setting said supply passageway valve and said by-passageway valve respectively to closed and open positions for flow of the engine oil through said by-passageway directly to the reservoir, said thermostat under predetermined temperature increase expanding to effect respectively opening and closure of said supply passageway valve and said by-passageway valve for flow of all the engine oil to the cooler, said thermostat body being axially movable relative to said by-passageway valve against the resistance of said spring when said by-passageway valve is closed, whereby overexpansion of said thermostat is relieved.

4. A valve structure for an internal combustion engine cooler connected to discharge the cooled oil into a reservoir from which the engine is supplied with lubricating oil by a pump, comprising a valve chamber for receiving the oil from the engine, a supply passageway from said valve chamber to the cooler, a by-passageway from said valve chamber directly to the reservoir, a valve for said supply passageway and a valve for said by-passageway, a thermostat comprising a body of generally cylindrical shape containing temperature-responsive medium and a plunger to be actuated thereby, said thermostat body extending through said valves and having shoulders, a spring between said valves tending to hold them against said shoulders, an abutment for the outer end of the thermostat plunger, said thermostat when contracted setting said supply passageway valve and said by-passageway valve respectively to closed and open positions for flow of the engine oil through said by-passageway directly to the reservoir, said thermostat under predetermined temperature increase expanding to effect respectively opening and closure of said supply passageway valve and said by-passageway valve for flow of all the engine oil to the cooler, said thermostat body being axially movable relative to said by-passageway valve against the resistance of said spring when said by-passageway valve is closed, whereby overexpansion of said thermostat is relieved, said by-passageway valve having a passage therethrough, a blowoff valve movable on said thermostat body and a spring normally holding said blowoff valve against said by-passageway valve to close said passage, said blowoff valve spring being responsive to a predetermined pressure to be opened for flow of the engine oil directly to the reservoir when said by-passageway valve and said supply passageway valve are respectively closed and open and the flow through the cooler is stopped.

5. A controlling valve structure for the radiator flow and warming chamber flow of an oil cooler, comprising a housing and a passageway therethrough for flow of oil to the radiator and warming chamber, said housing having an outlet passageway for oil from the radiator and another outlet passageway for the oil from the warming chamber, a valve in said housing for the radiator outlet passageway and a valve for the warming chamber outlet passageway, a thermostat comprising a body structure of generally cylindrical shape containing temperature-responsive medium and a plunger actuated thereby, an abutment on said housing for the outer end of said plunger, said thermostat body structure extending at its ends through said valves and providing supports therefor, a spring interposed between said valves tending to hold them in normal position on said supports, a second spring for holding said thermostat body structure for closure by said valve of said radiator outlet passageway and opening of said warming chamber outlet passageway when said thermostat is under comparatively low temperature whereby all of the cooler outlet flow will be through the warming chamber outlet passageway, said thermostat under predetermined increased temperature setting said valves for closure of the warming chamber outlet passageway and opening of the radiator outlet passageway, said warming chamber outlet passageway valve being slidable on said thermostat body structure against the resistance of said first-mentioned spring for opening of said warming chamber outlet passageway in the event of failure of radiator flow when said radiator outlet passageway valve is open.

6. Valve structure for an internal combustion engine oil cooler connected to discharge the cooled oil into a reservoir from which the engine is supplied with lubricating oil by a pump, comprising a valve chamber interposed in the path of the oil flow and having two passageways to the exterior thereof, a thermostat in said valve chamber between said passageways, valves for said passageways mounted on said thermostat, shoulders on said thermostat limiting outward movement of the valves thereon but permitting inward movement thereof, and a spring tending to hold said valves against said shoulders, said thermostat in response to temperature change carrying said valves for exposure of one of said passageways and closure of the other passageway, said spring permitting opening movement of the closed valve independently of movement of said thermostat.

7. Valve structure for an internal combustion engine oil cooler connected to discharge cooled oil into a reservoir from which the engine is supplied with lubricating oil by a pump, comprising a valve chamber having passageways to the exterior thereof, valves for said passageways, a thermostat structure within said valve chamber upon which said valves are mounted, shoulders on said thermostat structure for limiting outward movement of said valves thereon permitting inward movement thereof, and a spring tending to hold said valves against said shoulders, said thermostat structure being responsive to temperature change to carry said valves for closure of one of said passageways and exposure of the other, said spring permitting either valve after closure by said thermostat structure to be opened against the resistance of said spring by external pressure and independently of movement of said thermostat structure.

8. Valve structure for controlling the flow of oil from an internal combustion engine to an oil cooler, comprising a valve chamber having a first outlet passageway and a second outlet passageway, a thermostat structure of the so-called "Vernet" type having a body containing temperature response medium and a plunger, a stationary abutment for the plunger, a first valve and a second valve for said first and second passageways respectively, said valves being mounted on said thermostat concentric therewith and said first valve having a passageway therethrough, a shoulder on said thermostat body and a spring thereon tending to hold said first valve against said shoulder, a blow-off valve slidable on said thermostat body, and a spring tending to hold said blow-off valve against the outer side of said first valve for closure of the passageway therethrough, expansion of said thermostat medium in response to temperature increase causing movement of said body with the first and second valves thereon for opening of said second passageway by said second valve and closure of said first passageway by said first valve against the resistance of said blow-off valve spring, excess pressure in said valve chamber after closure of said first valve by said thermostat structure causing opening of said blow-off valve for flow of fluid through the passageway in said first valve.

9. Valve structure for controlling the flow of oil under pressure through a cooling structure and through a heating structure associated with the cooling structure for heating thereof, comprising annular valves interposed in the outlet flow of said structures, a thermostat of the so-called "Vernet" type having a body with temperature responsive medium therein, said valves being mounted on the thermostat body concentric therewith, said body having shoulders thereon, and a spring tending to hold said valves outwardly against said shoulders but permitting inward movement thereof on said body whereby upon closure of one of said valves by said thermostat structure said valve may be moved inwardly on the thermostat body by external pressure and against the resistance of the spring on said body.

10. A controlling valve structure for the radiator flow and warming chamber flow of an oil cooler, comprising a housing and a passageway therethrough for flow of oil to the radiator and warming chamber, said housing having an outlet passageway for oil from the radiator and another outlet passageway for the oil from the warming chamber, a valve in said housing for the radiator outlet passageway and a valve for the warming chamber outlet passageway, thermostat means subjected to the temperature of the oil flow through said outlet passageways for setting of said valves for apportionment of the flow through the radiator and flow through the warming chamber, and means whereby one of said valves, after closure thereof by said thermostat means, is movable independently of said thermostat means to respond to excess pressure in the corresponding outlet passageway for opening movement thereof.

11. A controlling valve structure for the radiator flow and warming chamber flow of an oil cooler, comprising a housing and a passageway therethrough for flow of oil to the radiator and warming chamber, said housing having an outlet passageway for oil from the radiator and another outlet passageway for the oil from the warming chamber, a valve in said housing for the radiator outlet passageway and a valve for the warming chamber outlet passageway, thermostat means mounting said valves and subjected to the temperature of the oil flow through said outlet passageways for setting of said valves for apportionment of the flow through the radiator and flow through the warming chamber, and means whereby one of said valves, after being closed by said thermostat means, is movable independently of said thermostat means to respond to excess pressure in the corresponding outlet passageway for opening movement thereof.

12. A controlling valve structure for the radiator flow and warming chamber flow of an oil cooler, comprising a housing having a passageway therethrough for flow of oil to the radiator and warming chamber, said housing having an outlet passageway for oil from the radiator and another outlet passageway for the oil from the warming chamber, a valve in said housing for the radiator outlet passageway and a valve for the warming chamber outlet passageway, thermostat means subjected to the temperature of the oil flow through said outlet passageways for setting of said valves for apportionment of the flow through the radiator and the flow through the warming chamber, and means whereby, when one of said valves is closed and the other valve opened by said thermostat means, the closed valve may move independently of said thermostat means in response to excess pressure in the corresponding outlet passageway caused by abnormal restriction to flow through the other outlet passageway.

GERVASE M. MAGRUM.
HARRY L. CHISHOLM, Jr.
ANDREW D. HODGE.